(12) United States Patent
Zhuge (10) Patent No.: US 9,910,873 B2
(45) Date of Patent: *Mar. 6, 2018

(54) EFFICIENT SORTING OF LARGE DATA SET WITH DUPLICATE VALUES

(71) Applicant: International Business Machines Corporation, Armonk, NY (US)

(72) Inventor: Yuke Zhuge, Portland, OR (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/191,893

(22) Filed: Jun. 24, 2016

(65) Prior Publication Data

US 2016/0378832 A1 Dec. 29, 2016

Related U.S. Application Data

(63) Continuation of application No. 14/750,385, filed on Jun. 25, 2015.

(51) Int. Cl.
*G06F 7/00* (2006.01)
*G06F 17/30* (2006.01)
*G06F 7/24* (2006.01)
*G06F 7/22* (2006.01)

(52) U.S. Cl.
CPC ............ *G06F 17/303* (2013.01); *G06F 7/22* (2013.01); *G06F 7/24* (2013.01); *G06F 17/30318* (2013.01); *G06F 17/30525* (2013.01)

(58) Field of Classification Search
CPC ....................................................... G06F 7/24
See application file for complete search history.

(56) References Cited

U.S. PATENT DOCUMENTS

| 5,123,057 | A | * | 6/1992 | Verly ................... G06K 9/3241 382/156 |
| 5,497,486 | A | | 3/1996 | Stolfo et al. |
| 5,717,915 | A | | 2/1998 | Stolfo et al. |
| 6,366,911 | B1 | | 4/2002 | Christy |
| 8,140,585 | B2 | | 3/2012 | Chen et al. |
| 2003/0126127 | A1 | * | 7/2003 | Abdo ................ G06F 17/30536 |
| 2007/0071240 | A1 | | 3/2007 | Shipley et al. |
| 2010/0031003 | A1 | * | 2/2010 | Chen .................... G06F 9/30021 712/30 |

(Continued)

OTHER PUBLICATIONS

Frazer et al. "Samplesort: A Sampling Approach to Minimal Storage Tree Sorting." Journal of the Association for Computing Machinery, vol. 17, No. 3, Jul. 1970, pp. 496-507.*

(Continued)

*Primary Examiner* — Charles Lu
(74) *Attorney, Agent, or Firm* — Patterson + Sheridan, LLP (57) ABSTRACT

Techniques are disclosed for sorting an input data set. A sort tool determines a distribution of values of a data set that includes a plurality of data records. The sort tool partitions the data set into a plurality of subsets based on the distribution. Each of the data records is inserted into one of the subsets based on a corresponding sort value of the data record. The sort tool identifies one or more of the subsets that contain at least two distinct sort values. In each of the identified subsets, the data records are sorted by a corresponding sort value of the data record.

20 Claims, 7 Drawing Sheets

(56) References Cited

U.S. PATENT DOCUMENTS

2010/0223269 A1* 9/2010 Shuf ................. G06F 17/30486
707/753
2014/0372456 A1* 12/2014 Merrill ...................... G06F 7/24
707/752

OTHER PUBLICATIONS

Software Patent Institute et al.; "The Rebound Sorter: An Efficient Sort Engine for Large Files"; IP.com Prior Art Database Technical Disclosure; <http://ip.com/IPCOM/000148560>; Mar. 30, 2007, 27 pages.
IBM et al.; "Efficient Parallel Quicksort Using Fetch-And-Add in Multi-Processor Computing Systems"; IP.com Prior Art Database Technical Disclosure; <http://ip.com/IPCOM/000057709>; Feb. 15, 2005, 7 pages.
International Business Machines Corporation, "List of IBM Patents or Patent Applications Treated as Related," Jun. 24, 2016, 2 pages.

\* cited by examiner

EFFICIENT SORTING OF LARGE DATA SET WITH DUPLICATE VALUES

This application is a continuation of co-pending U.S. patent application Ser. No. 14/750,385, filed Jun. 25, 2015. The aforementioned related patent application is herein incorporated by reference in its entirety.

BACKGROUND

Embodiments presented herein generally relate to database management systems, and more specifically, to efficiently sorting a large set of database records.

Database management systems (DBMS) provide functions for defining, creating, querying, updating, and administrating databases. Sorting records in a database is a well-known issue in database management. A DBMS may receive a large amount of unsorted database records. So that the database records are more easily indexed and searchable, the DBMS must sort the database records. Sorting is a common but computationally expensive operation in data processing.

A sorting technique commonly used in a DBMS is sample sort. Sample sort is a technique often used in parallel processing systems. Under the sample sort approach, a DBMS receives an input data set of database records to be sorted by value (e.g., by character value, by integer value, etc. of a given record column). The DBMS defines partitions and partition ranges for the data set based on a sampling of the data set. Then, the DBMS inserts each record into an appropriate partition. The DBMS sorts each individual partition and merges the partitions to create a sorted data set.

SUMMARY

One embodiment presented herein describes a method. The method generally includes determining a distribution of values of a data set that includes a plurality of data records. The method also includes partitioning the data set into a plurality of subsets based on the distribution. Each of the data records is inserted into one of the subsets based on a corresponding sort value of the data record. One or more of the subsets that contain at least two distinct sort values are identified. In each of the identified subsets, the data records are sorted by a corresponding sort value of the data record.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE SEVERAL VIEWS OF THE DRAWINGS

So that the manner in which the above recited features, advantages, and objects of the present disclosure are attained and can be understood in detail, a more particular description of the present disclosure, briefly summarized above, may be had by reference to the embodiments thereof which are illustrated in the appended drawings.

Note, however, that the appended drawings illustrate only typical embodiments of the present disclosure and are therefore not to be considered limiting of its scope, for the present disclosure may admit to other equally effective embodiments.

DETAILED DESCRIPTION

One issue with traditional sample sort techniques is handling partitions that exclusively contain records that all have a single value to be sorted. In such a case, the partition is already sorted—because the partition has records of only one value, no further sorting needs to take place. However, the traditional sample sort approach does not discern between partitions having only a single value and partitions that have a variety of values. As a result, the sample sort approach stills performs a sort operation on partitions having only a single value. As a result, the DBMS incurs the computational cost of sorting those partitions. Consequently, performance is affected.

Embodiments presented herein provide techniques for sorting a large data set. For example, the techniques may be adapted to sorting records in a database. In one embodiment, a database management system (DBMS) receive a large set of unsorted database records that need to be sorted by a value, such as by character value (e.g., by username, address, company name, etc.) or by numerical value (e.g., by employee ID, social security number, phone number, etc.). In one embodiment, a DBMS application includes a sort tool that performs a sample sort-based technique on the large data set that optimizes over partitions storing records of a single value.

The sort tool samples the data set and generates an equi-depth histogram over the sample. Doing so allows the sort tool to determine how many partitions to create for the dataset and a value range for each partition. Thereafter, the sort tool distributes the records to appropriate partitions. In one embodiment, the sort tool tracks record values as the records are inserted into a given partition. The sort tool does so to identify partitions that contain multiple records of a single sort key value. The sort tool performs a sort operation on the partitions that do not contain records of a single value.

In one embodiment, the histogram identifies partitions that are likely to have records of a single sort value. Such "likely single value" hint is created on histogram bins (ie. partition ranges) when the histogram was built from the sample. The sort tool further sub-partitions any partitions with such "likely single value" hint into a majority partition and a minority partition. Doing so allows the sort tool to account for partitions where a substantial amount of the records have a single sort value, but nonetheless contain records that have values that differ from that single value. The majority partition contains the records having the single sort value (e.g., that matches a start key value of the original partition), and the minority partition contains the records having a value different from that single value. As a result, the majority partition includes partitions that definitely have records of a single sort value. The sort tool performs a sort operation on the minority partition and leaves the majority partition as-is.

The sort tool then merges the partitions to form a sorted data set. Advantageously, by tracking single-value partitions during a sample sort operation, the sort tool avoids additional computation in sorting those single-value partitions, regardless of the size of partition. As a result, the overall cost of sorting a given data set is comparatively lower than an overall cost of sorting that data set using a traditional sample sort approach. Further, the modified sample sort approach is not adversely affected in the case where duplicate values are infrequent, as the overhead of tracking duplicate values is negligible. For instance, as further described below, duplicate values can be tracked (e.g., using a flag) during a lookup stage where records are inserted into a given partition.

Figure 1:
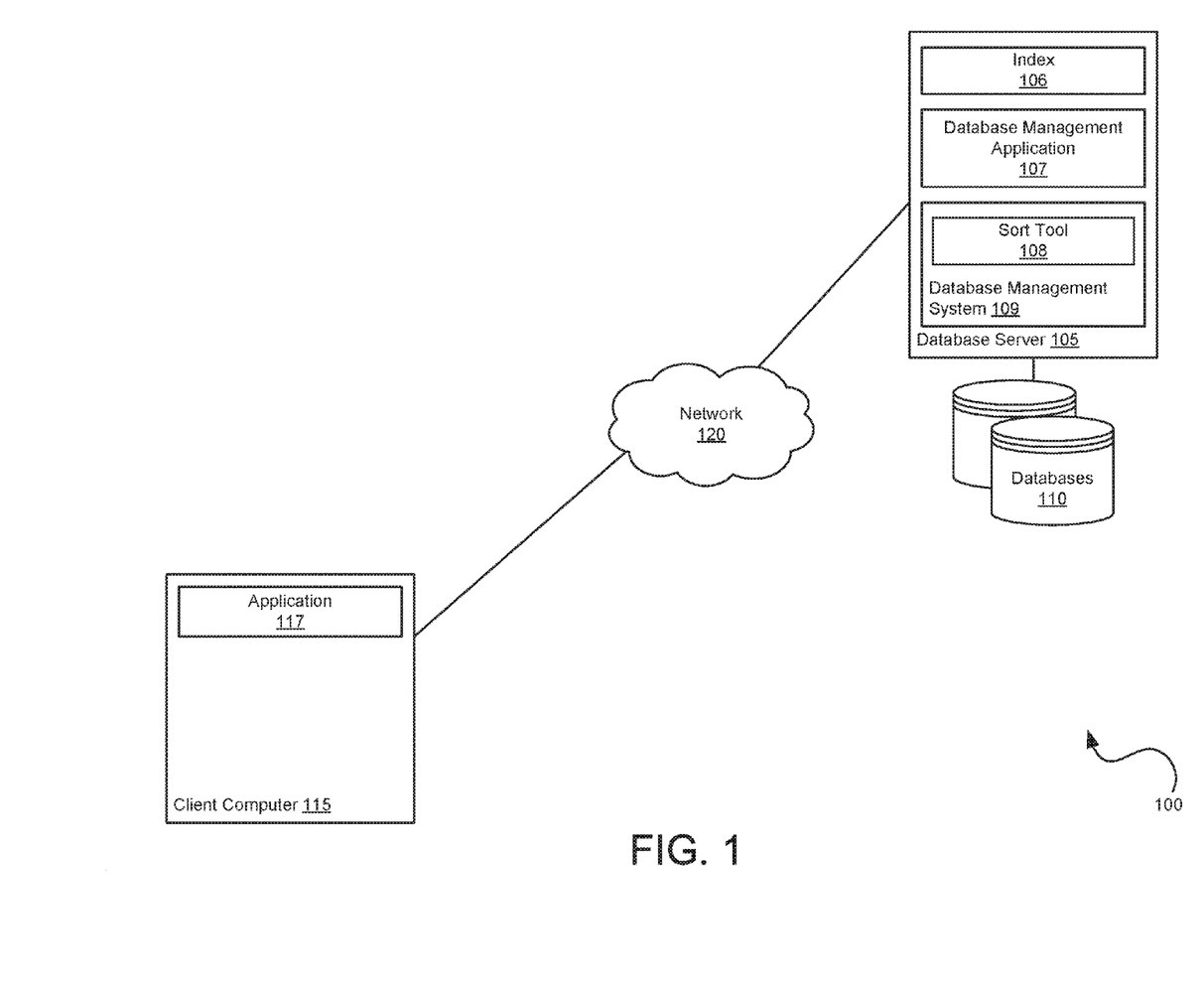
FIG. 1 illustrates an example computing environment, according to one embodiment.

FIG. 1 illustrates an example computing environment 100, according to one embodiment. As shown, computing environment 100 includes a database server 105, databases 110, a client computer 115, and a network 120.

Illustratively, the client computer 115 includes an application 117 that communicates with the database server 105 to submit database requests (e.g., query statements) to the database server 105. Although shown as a single client computer, the client computer 105 is included to be representative of a single client or multiple clients. The database server 105 includes an index 106, a database management application 107, and a database management system (DBMS) 109.

The database management application 107 processes requests sent by the client computer 115 to the database server 105. For instance, the database management application 107 sends query statements to the DBMS 109. The DBMS 116 includes one or more software applications configured to manage the databases 110. The index 112 may store database table columns managed by the database management application 114.

In one embodiment, the DBMS 109 further includes a sort tool 108. The sort tool 108 receives an input data set containing a number of records, e.g., in response to a request to the DBMS 109 to return a list of records in the corresponding database file, sorted by a specified value, such as by character value, numerical value, and the like. The sort tool 108 applies sorting techniques to organize the records by value. In one embodiment, the sort tool 108 applies a modified sample sort technique. As known, the traditional sample sort technique creates partitions from a given data set, where an amount of partitions and partition ranges are defined based on a sample of the data set. In one embodiment, the modified sample sort technique tracks each partition while inserting records into an assigned partition. In particular, the sort tool 108 tracks a given partition to determine whether the partition contains multiple records of a single sort key value. The sort tool 108 generally only performs a sort operation on those partitions containing records of differing values. That is, the sort tool 108 does not sort partitions containing records of a single value. As a result, the sort tool 108 avoids computational costs that would be incurred by sorting the single-value partition.

Figure 2:
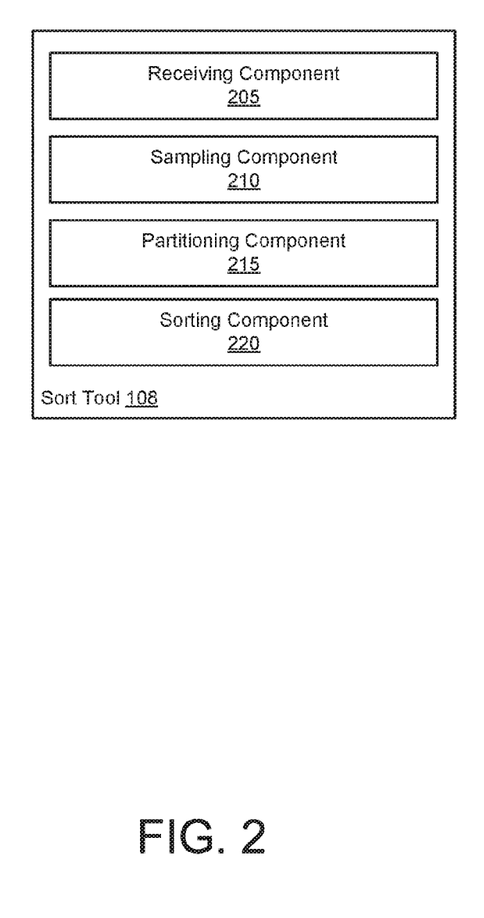
FIG. 2 further illustrates the sort tool shown in FIG. 1, according to one embodiment.

FIG. 2 further illustrates the sort tool 108, according to one embodiment. As shown, the sort tool 108 includes a receiving component 205, a sampling component 210, a partitioning component 215, and a sorting component 220.

In one embodiment, the DBMS 109 sends an input data set of database records to the receiving component 205. The database records may be of any type of data that can be stored into a record. Each database record is organized in fields having specified values. For example, the input data set may be employee records that specify information such as employee ID, name, department, branch, home address, social security number, and the like.

The sampling component 210 determines an appropriate sample distribution from the data set to use in defining sort partitions. For example, based on the amount of records in the data set, the sampling component 210 may determine to sample a given percentage of the data set, e.g., 1% of the data set, 10% of the data, etc. Sampling the data set allows the sort tool 108 to more optimally define sort partitions and ranges.

In one embodiment, the partitioning component 215 generates an equi-depth histogram of the sample. The histogram displays a distribution of records over identified values. The partitioning component 215 uses the histogram to define an amount of partitions and ranges for those partitions in which to insert the records. In one embodiment, the partitioning component 215 may track the start and end key of each histogram bin. Doing so allows the partitioning component 215 to identify partitions that are likely to be a single-value partition. That is, if the start and end keys of a given bin are equal, then the corresponding partition is likely to be a single-value partition.

Each of the defined partitions may include a start key value that the partitioning component 215 uses to determine record placement. In one embodiment, the partitioning component 215 uses binary search methods to determine in which of the defined partitions to insert a given record. Further, for each partition, the partitioning component 215 maintains a "single-value flag." A single-value flag marked as true indicates that a given partition is a single-value partition (i.e., a partition having multiple records of a single sort key value). The single-value flag is initialized to true. In one embodiment, as the partitioning component 215 places each record into a given partition, the partitioning component 215 compares the value of that record with the start key value of the partition. If the values are not equal, then the partitioning component 215 marks the single-value flag for that partition as false. In such a case, the single-value flag remains false even after all records have been placed in an appropriate partition. Of course, other methods may be used to track whether a given partition is a single-value partition.

In one embodiment, the partitioning component 215 may create sub-partitions from partitions having the "likely single value" hint marked as true. The partitioning component 215 may create a majority and a minority sub-partition from partitions having the "likely single value" hint marked as true. The partitioning component 215 inserts records with values that are equal to the start key value into the majority sub-partition and inserts records with values that are not equal to the start key value into the minority sub-partition.

In one embodiment, the sorting component 220 performs a sorting operation over the non-single-value partitions. That is, the sorting component 220 avoids performing a sorting operation on single-value partitions because the partitions are already sorted. The sorting component 220 merges the sorted partitions (and sub-partitions) together to form a sorted data set. The sorting component 220 may output the sorted data set to the DMBS 109. Further, in one embodiment, the sorting component 220 may assign a partition to a given processor in the database server 105 that performs the sort operation.

The majority and minority partition approach has several practical applications. For instance, when a partition has 90% of records on a single value, 10% on other values, the 90% can be contained in the majority partition and avoid sorting. Only the small amount of records in the minority partition need to be sorted.

Figure 3:
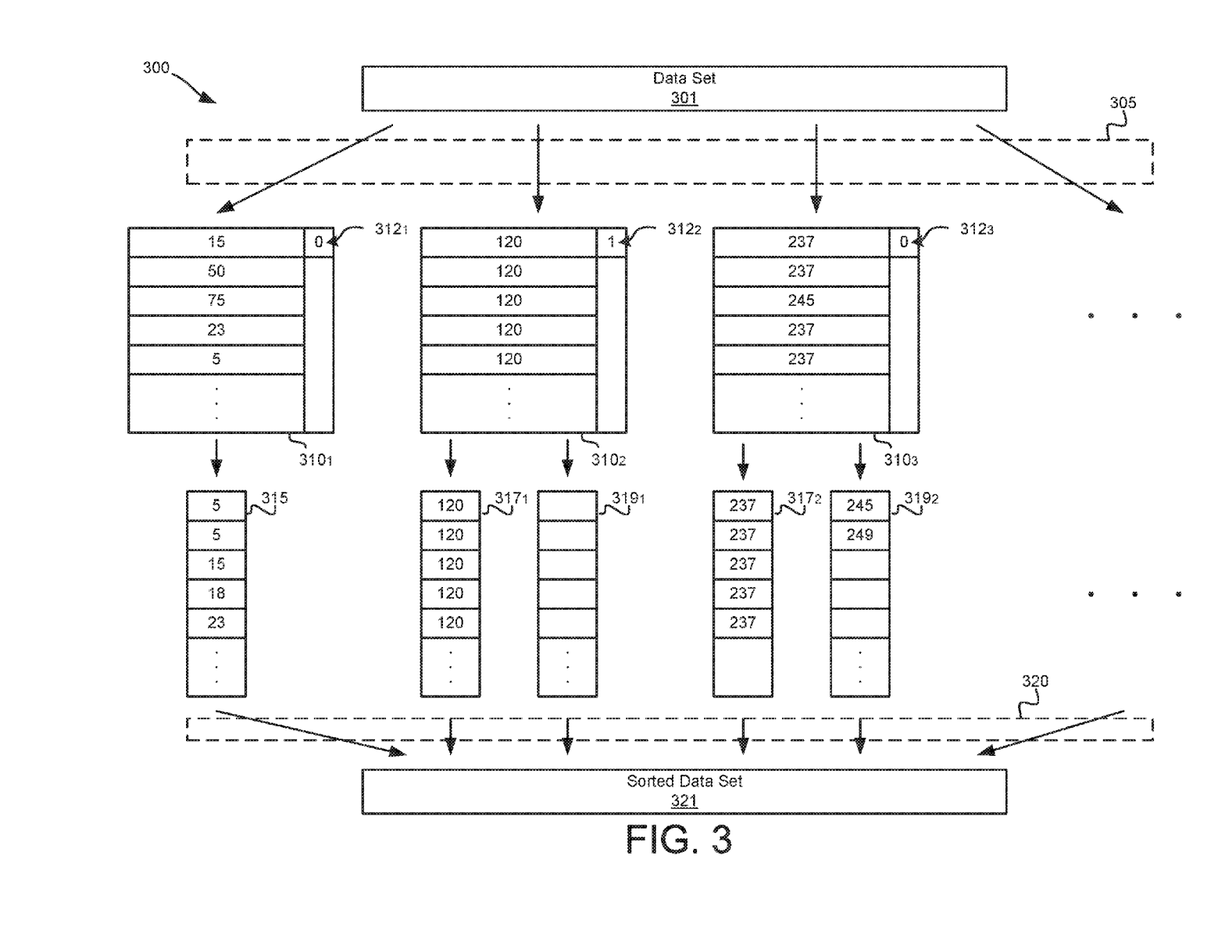
FIG. 3 illustrates a diagram for performing a modified sample sort operation on a large data set, according to one embodiment.

FIG. 3 illustrates an example 300 of sorting a large input data set 301 using the sort tool 108, according to one embodiment. The sampling component 210 may determine a sample from the data set 301. The partitioning component 215 may generate a histogram from the sample of the data set 301. As stated, the histogram provides a distribution of an amount of records over record values. The histogram allows the partitioning component 215 to define an amount of partitions to create and ranges of values for each partition to contain. The histogram may also identify which partitions are likely to be a single-value partition, based on bins having an equal start key value and end key value. Once defined, the partitioning component 215 creates the partitions (at 305).

FIG. 3 shows the partitions $310_{1-n}$. Illustratively, each of the partitions $310_{1-n}$ contain a number of unsorted integer values. Each of the partitions $310_{1-n}$ also include a single-value flag bit $312_{1-n}$. As stated, a single-value flag of a given partition indicates that a partition is a single-value partition (i.e., the record values in the partition are identical to one another). For example, the partition $310_1$ includes differing integer values (15, 50, 75, etc.). As such, the single-value flag bit $312_1$ has a value 0 (i.e., marked as false). In contrast, the partition $312_2$ appears to include identical integer values. As stated, if the partitioning component 215 does not track a value that differs from the start key value of the partition, then the single-value flag remains marked as true. Illustratively, the single-value flag bit $312_2$ has a value of 1 (i.e., marked as true.)

As stated, it is possible that partitions identified by the histogram are likely single-value actually contain records of multiple sort values, i.e., the partition may contain values that differ from a predominant value. For example, partition $310_3$ appears to have a substantial amount of integer values of 237. However, partition $310_3$ also shows a differing integer value of 245. Thus, the single-value flag bit $312_3$ has a value 0 (i.e., marked as false).

The partitioning component 215 may create sub-partitions from partitions having a "likely single value" hint marked as true. As stated, the sub-partitions includes a majority partition and a minority partition. The majority partition includes values that match the start key value of the underlying partition. The minority partition includes all other values. As shown, the partition $312_2$ is further partitioned into a majority partition $317_1$ and minority partition $319_1$. As shown, the minority partition $319_1$ does not include any values. In contrast, the partition $312_3$ is further partitioned into a majority partition $317_2$ and a minority partition $319_2$. The minority partition $319_2$ includes values that differ from the majority partition $317_2$.

The sorting component 220 sorts each of the partitions, as shown in sorted partition 315, majority partitions $317_{1-2}$, and minority partitions $319_{1-2}$. The sorting component 220 merges the sorted partitions (at 320) to form a sorted data set 321.

Figure 4:
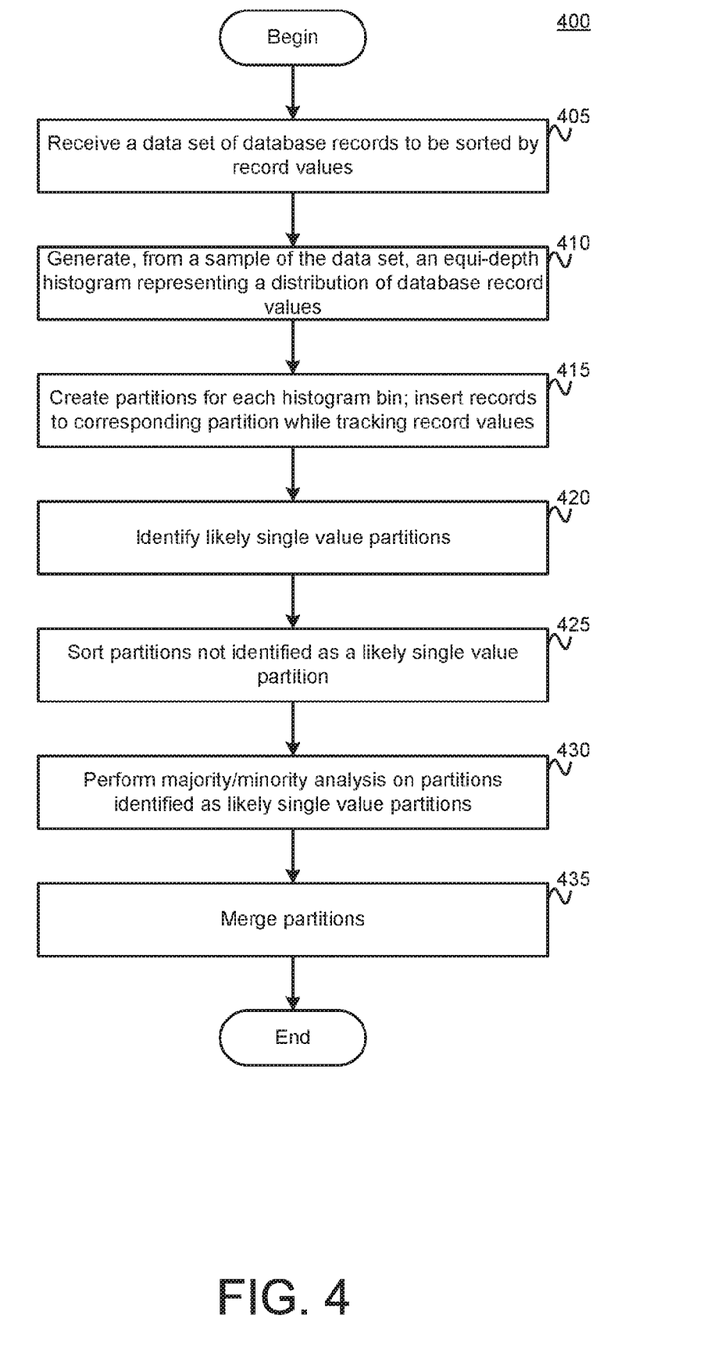
FIG. 4 illustrates a method for sorting a large data set of database records, according to one embodiment.

FIG. 4 illustrates a method 400 for sorting a large data set of database records, according to one embodiment. As shown, method 400 begins at step 405, where the receiving component 205 obtains a data set of database records to be sorted by a specified record value (e.g., by character value, by numerical value, etc.). The sampling component 210 determines a sample from the data set. The sample may be a specified percentage of the data set (e.g., 1% of the records in the data set, 5% of the records in the data set, 10% of the records in the data set).

At step 410, the partitioning component 215 generates, from the sample, an equi-depth histogram. As stated, the equi-depth histogram represents a distribution of an amount of records over record values. The partitioning component 215 uses each histogram bin to define partitions and partition ranges for sorting. At step 415, the partitioning component 215 creates partitions based on the histogram bins. The partitioning component 215 inserts each record to a corresponding partition. As stated, the partitioning component 215 also tracks the record values to determine whether a given partition remains a single-value partition. For instance, the partitioning component 215 may use a single-value flag that is initially marked as true. The partitioning component 215, while inserting records, can evaluate the record value against a start key value of the partition. This is later described relative to FIG. 5.

At step 420, the partitioning component 215 identifies partitions that are likely to be single-value partitions. As stated, the equi-depth histogram can track partitions likely to be single-value partitions based on the values of the start key and the end key of a bin. At step 425, the sorting component 220 sorts partitions having a single-value flag marked as false and "likely single value" hint as false. Sorting is skipped on partitions having single-value flag as true. No further processing is needed on those partitions. Further analysis on partitions having "likely single value" hint will be done in 430. The following table shows processing for various kinds of partitions:

| Single value flag | Likely single value hint | Action |
| --- | --- | --- |
| 0 | 0 | Sort |
| 0 | 1 | majority/minority analysis |
| 1 | 0 | No further processing |
| 1 | 1 | No further processing |

At step 430, the partitioning component 215 performs a majority/minority analysis on the partitions identified as potential single-value partitions. That is, the partitioning component 215 creates majority and minority sub-partitions for each of the partitions having "likely single value" hint marked as true. This is further described relative to FIG. 6. The result of the analysis is sorted majority and minority sub-partitions. An embodiment may choose to apply majority/minority method directly on a partition range, avoiding creating an intermediate partition that will be split into majority/minority sub-partitions.

At step 435, the sorting component 220 merges the partitions (and majority and minority sub-partitions) together to form the sorted data set. The sorting component 220 may return the sorted data set to the DBMS 109.

Figure 5:
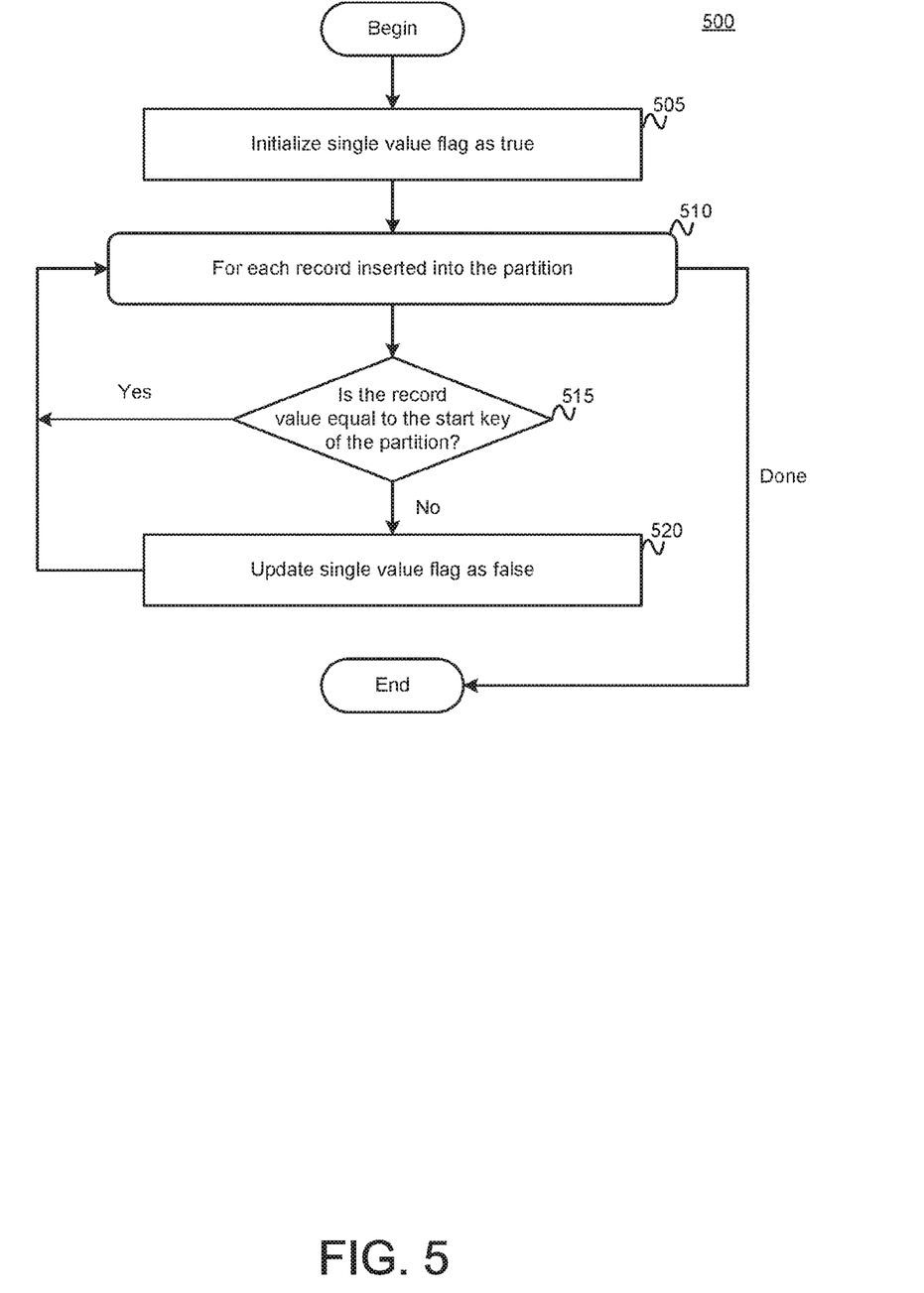
FIG. 5 illustrates a method for identifying single-value partitions during a sample sort operation of a large data set, according to one embodiment.

FIG. 5 illustrates a method 500 for identifying single-value partitions during a sample sort operation of a large data set, according to one embodiment. In particular, method 500 takes place while the partitioning component 215 inserts records into an appropriate partition. Method 500 begins at step 505, the partitioning component 215 initializes the single-value flag of the partition as true.

At step 510, the partitioning component 215 performs the following steps 515 and 520 for each record inserted into the partition. At step 515, the partitioning component 215 determines whether the record value is equal to the value of the start key of the partition. If so, then the partitioning component 215 leaves the single-value flag intact. Otherwise, if the record value is not equal to the start key value, then the partitioning component 215 marks the single-value flag as false. The single-value flag remains false as additional records are inserted into the partition.

Figure 6:
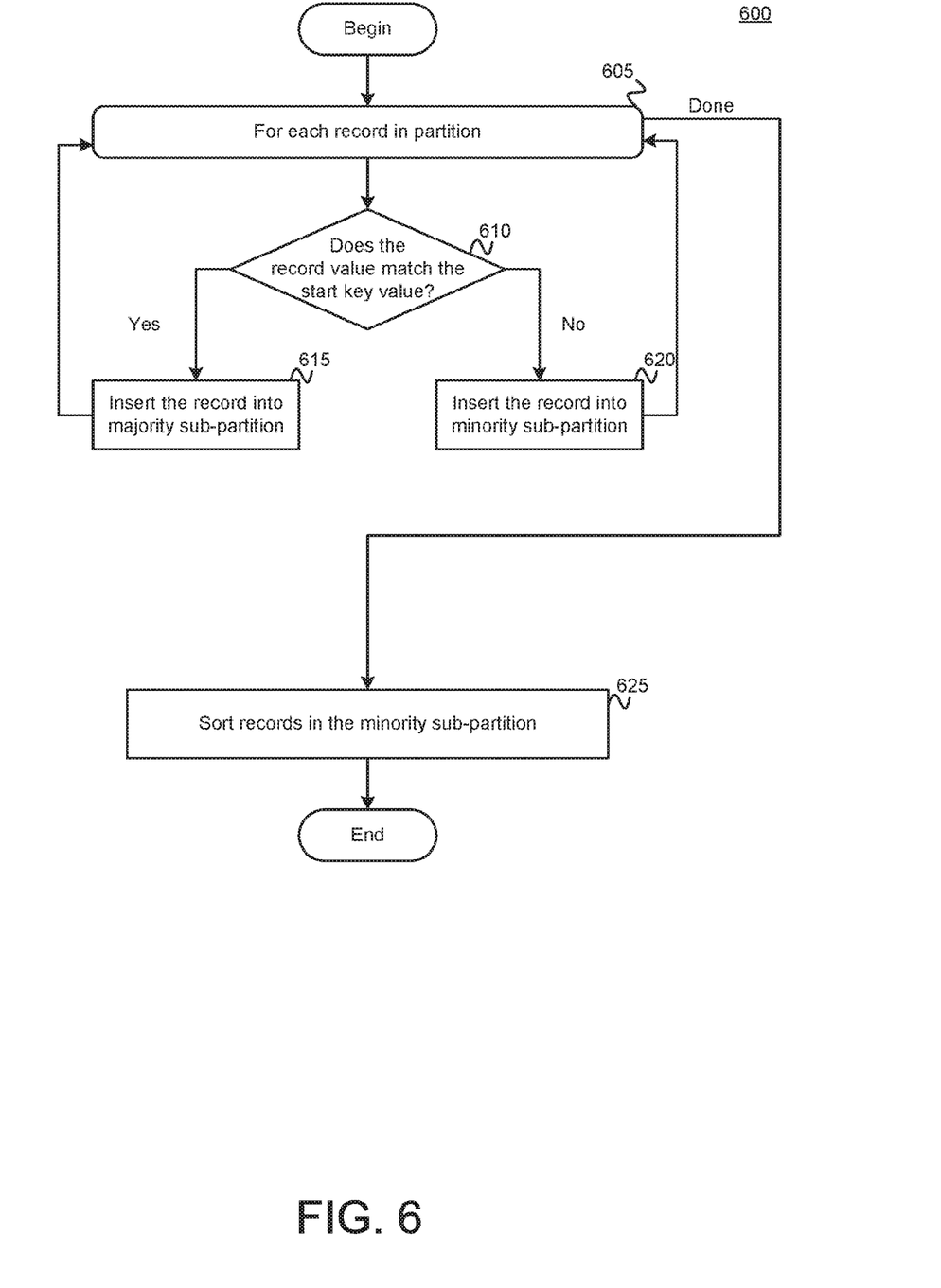
FIG. 6 illustrates a method for analyzing a sort partition that is likely to be a single-value partition, according to one embodiment.

FIG. 6 illustrates a method 600 for analyzing a sort partition having a likely single-value flag marked as true, according to one embodiment. As noted, likely single-value flag marked as true indicates that the partition is likely a single-value partition. However, because of sampling errors, the partition may contain other values. Therefore, the partitioning component 215 further divides such partitions into a majority sub-partition and a minority sub-partition. The majority sub-partition includes records having values matching the start key value of the original partition. The majority sub-partition includes all other records of the original partition.

Method 600 begins at step 605, where the partitioning component 215 performs the following steps for each record in the partition. At step 610, the partitioning component 215 determines whether the record value matches the start key value of the partition. If so, then at step 615, the partitioning component 215 inserts the record into the majority sub-partition. Otherwise, if the record value does not match the start key value, then the partitioning component 620 inserts the record into the minority sub-partition.

Once the sub-partitioning is complete, at step 625, the sorting component 220 performs a sort operation over the records in the minority sub-partition. The sorting component 220 avoids sorting the records in the majority sub-partition before the values are uniform, and, therefore, sorting the majority sub-partition is not necessary.

Figure 7:
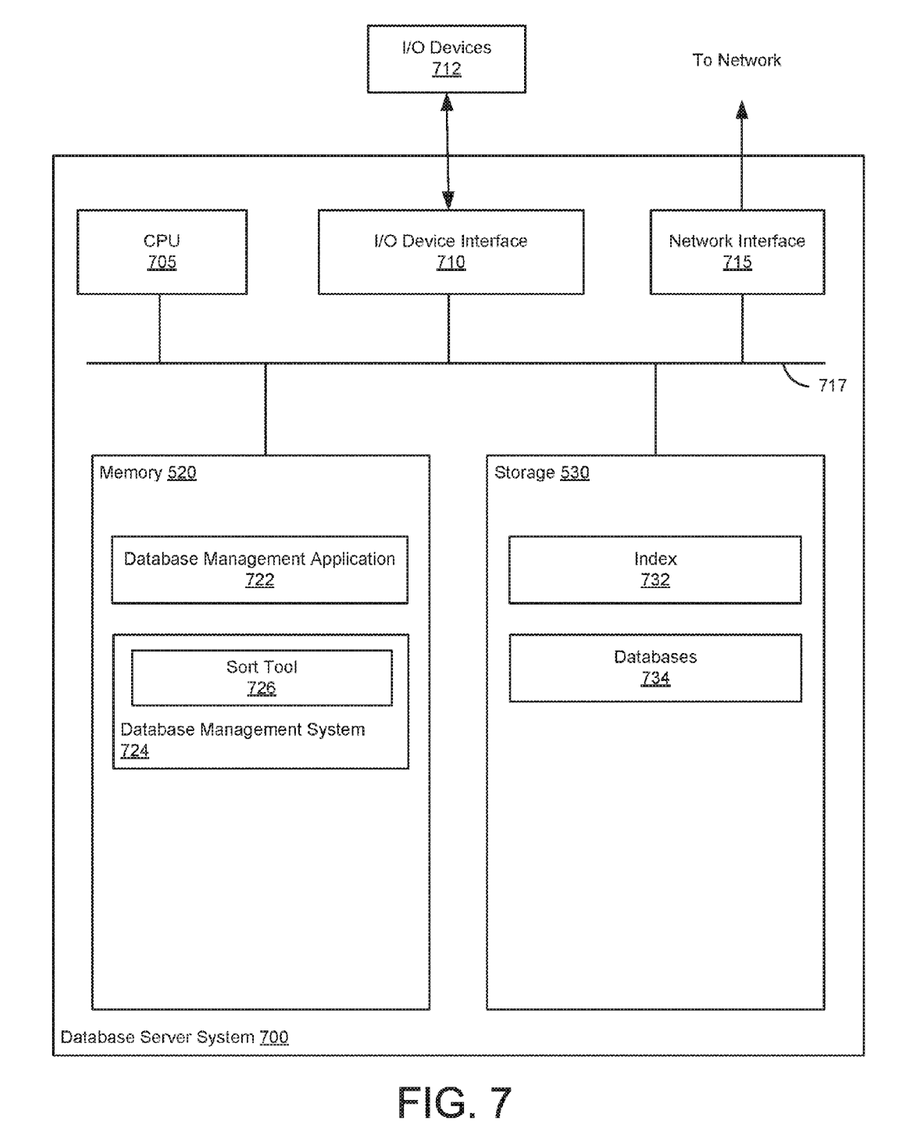
FIG. 7 illustrates an example database server, according to one embodiment.

FIG. 7 illustrates an example database server system 700, according to one embodiment. As shown, the system 700 includes, a central processing unit (CPU) 705, a network interface 715, a memory 720, and storage 730, each connected to a bus 717. The database server system 700 may also include an I/O device interface 710 connecting I/O devices 712 (e.g., keyboard, display and mouse devices) to the computing system 700. Further, in context of this disclosure, the computing elements shown in the database server system 700 may correspond to a physical computing system.

CPU 705 retrieves and executes programming instructions stored in memory 720 as well as stores and retrieves application data residing in the storage 730. As stated, the CPU 705 may be configured to support hardware transactional memory tasks to the memory 720. The bus 717 is used to transmit programming instructions and application data between CPU 705, I/O devices interface 710, storage 730, network interface 717, and memory 720. Note, CPU 705 is included to be representative of a single CPU, multiple CPUs, a single CPU having multiple processing cores, and the like. Memory 720 is generally included to be representative of a random access memory. Storage 730 may be a disk drive storage device. Although shown as a single unit, storage 730 may be a combination of fixed and/or removable storage devices, such as fixed disc drives, removable memory cards, or optical storage, network attached storage (NAS), or a storage area-network (SAN).

Illustratively, memory 720 includes a database management application 722 and a database management system (DBMS) 724. The DMBS 724 further includes a sort tool 726. And storage 730 includes an index 732 and databases 734. The database management application 722 processes requests sent by a client computer to the database server 700. The DBMS 724 includes one or more software applications configured to manage the databases 734. The sort tool 726 applies a modified sample sort technique that tracks single-value partitions while inserting records into an assigned partition. The sort tool 726 performs a sort operation on partitions that are not identified to be a single-value partition. Further, in one embodiment, the sort tool 726 may sub-partition a single-value partition into a majority partition and a minority partition to account for partitions where a substantial amount of the records have a single value, but contain records that have values that differ from that single value. The majority partition contains the records having the single value (e.g., that matches a start key value of the original partition), and the minority partition contains the records having a value different from that single value. The sort tool 726 performs a sort operation on the minority partition. Further, the sort tool 726 may merge the partitions into a sorted data set.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the sort tool) or related data available in the cloud. For example, the sort tool 108 could execute on a computing system in the cloud and track single-value partitions in a sample sort operation over a large data set. As another example, the sort tool 108 could sample information and store sampling statistics at a storage location in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method to reduce processing overhead in sorting a data set having duplicate values, the computer-implemented method comprising:
    determining a distribution of values of an unsorted data set that includes a plurality of data records, wherein the distribution specifies a plurality of partitions of the unsorted data set and further specifies, for each partition, an estimate of whether the respective partition consists of duplicates of a respective sort value;
    partitioning the unsorted data set into the plurality of partitions based on the distribution, wherein each of the data records is inserted into one of the partitions based on a corresponding sort value of the data record, including maintaining, for each partition, a flag indicating whether the respective partition actually consists of duplicates of the respective sort value;
    upon determining that the estimate that a first of the partitions consists of duplicates is actually false, sub-partitioning the data records of the first partition into uniform and variable sub-partitions, respectively, by operation of one or more computer processors;
    identifying one or more of the partitions that each contains at least two distinct sort values, the one or more partitions including the first partition;
    sorting the data records in each of the identified partitions, including sorting the variable sub-partition without sorting the uniform sub-partition, which avoids a processing overhead of sorting the data records in the uniform sub-partition; and
    subsequent to sorting the data records in each of the identified partitions, generating a sorted data set by merging the plurality of partitions, wherein the sorted data set is output.

2. The computer-implemented method of claim 1, wherein determining the distribution of values of the unsorted data set comprises:
    sampling the unsorted data set; and
    generating an equi-depth histogram of the plurality of data records, wherein the equi-depth histogram determines: (i) the distribution of the values of the data records; (ii) an amount of the partitions; and (iii) the respective estimate of whether each partition consists of duplicates of the respective sort value.

3. The computer-implemented method of claim 1, wherein partitioning the data records into the plurality of partitions based on the distribution comprises, for each partition:
    initializing the flag of the partition as true, wherein the flag set as true indicates that the corresponding sort values of the data records of the partition do not differ from one another; and
    for each data record inserted in the partition, evaluating the data record, comprising determining whether a corresponding value of the data record is equal to a start key value of the partition, wherein the start key value is a corresponding value of an data record initially inserted into the partition.

4. The computer-implemented method of claim 3, wherein identifying the one or more of the partitions comprises, for each data record inserted in the partition:
upon determining that the corresponding value of the data record is not equal to the start key value, setting the flag of the partition as false.

5. The computer-implemented method of claim 1, wherein determining the distribution of values of the data set comprises sampling the data set, wherein a set for the sampling is determined based on database statistics.

6. The computer-implemented method of claim 1, wherein a second of the partitions, having an estimate of consisting of duplicates that is actually true, is not sub-partitioned into uniform and variable sub-partitions;
wherein a third of the partitions, having an estimate of not consisting of duplicates that is actually true, is not sub-partitioned into uniform and variable sub-partitions;
wherein the first partition is a mostly-uniform partition, wherein the second partition is a fully-uniform partition, wherein the third partition is a variable partition.

7. The computer-implemented method of claim 6, wherein sorting the data records in each of the identified partitions comprises:
sorting the variable partition and the variable sub-partition of the mostly-uniform partition without sorting the fully-uniform partition and without sorting the uniform sub-partition of the mostly-uniform partition, which avoids a processing overhead of sorting the data records in the uniform partition and the data records in the uniform sub-partition of the mostly-uniform partition.

8. The computer-implemented method of claim 7, wherein determining the distribution of values of the unsorted data set comprises:
sampling the unsorted data set, wherein a set for the sampling is determined based on database statistics; and
generating a histogram of the plurality of data records, wherein the histogram determines: (i) the distribution of the values of the data records; (ii) an amount of the partitions; and (iii) the respective estimate of whether each partition consists of duplicates of the respective sort value.

9. The computer-implemented method of claim 8, wherein partitioning the data records into the plurality of partitions based on the distribution comprises, for each partition:
initializing the flag of the partition as true, wherein the flag set as true indicates that the corresponding sort values of the data records of the partition do not differ from one another; and
for each data record inserted in the partition, evaluating the data record, comprising determining whether a corresponding value of the data record is equal to a start key value of the partition, wherein the start key value is a corresponding value of an data record initially inserted into the partition.

10. The computer-implemented method of claim 9, wherein identifying the one or more of the partitions comprises, for each data record inserted in the partition:
upon determining that the corresponding value of the data record is not equal to the start key value, setting the flag of the partition as false;
wherein the computer-implemented method is performed by a sort tool component of a database management system operatively connected to a client application via a network, wherein the computer-implemented method is performed responsive to receiving a request from the client, the sort tool component having a plurality of sub-components including a receiving sub-component, a sampling sub-component, a partitioning sub-component, and a sorting sub-component;
wherein the histogram comprises an equi-depth histogram, wherein each estimate comprises a respective single-value hint, wherein each flag comprises a respective single-value flag.

11. The computer-implemented method of claim 10, wherein the receiving sub-component is configured to receive the unsorted data set;
wherein the sampling sub-component is configured to sample the unsorted data set and generate the equi-depth histogram of the plurality of data records;
wherein the partitioning sub-component is configured to partition and sub-partition the unsorted data set;
wherein the sorting sub-component is configured to sort the variable partition and the variable sub-partition of the mostly-uniform partition without sorting the fully-uniform partition and without sorting the uniform sub-partition of the mostly-uniform partition.

12. The computer-implemented method of claim 1, wherein each estimate comprises a respective single-value hint.

13. The computer-implemented method of claim 1, wherein each flag comprises a respective single-value flag.

14. The computer-implemented method of claim 1, wherein the first partition is a mostly-uniform partition.

15. The computer-implemented method of claim 1, wherein a second of the partitions, having an estimate of consisting of duplicates that is actually true, is not sub-partitioned into uniform and variable sub-partitions.

16. The computer-implemented method of claim 15, wherein the second partition is a fully-uniform partition.

17. The computer-implemented method of claim 16, wherein sorting the data records in each of the identified partitions excludes sorting the fully-uniform partition.

18. The computer-implemented method of claim 1, wherein a third of the partitions, having an estimate of not consisting of duplicates that is actually true, is not sub-partitioned into uniform and variable sub-partitions.

19. The computer-implemented method of claim 18, wherein the third partition is a variable partition.

20. The computer-implemented method of claim 19, wherein sorting the data records in each of the identified partitions includes sorting the variable partition.

* * * * *